(12) United States Patent
Kitago (10) Patent No.: US 8,290,256 B2
(45) Date of Patent: Oct. 16, 2012

(54) IMAGE PROCESSING APPARATUS AND IMAGE PROCESSING METHOD

(75) Inventor: Masaki Kitago, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 331 days.

(21) Appl. No.: 12/850,985

(22) Filed: Aug. 5, 2010

(65) Prior Publication Data

US 2011/0069881 A1 Mar. 24, 2011

(30) Foreign Application Priority Data

Sep. 24, 2009 (JP) ................................ 2009-219767

(51) Int. Cl.
*G06K 9/34* (2006.01)
(52) U.S. Cl. ................... 382/164; 382/162; 382/166
(58) Field of Classification Search .............. 382/162, 382/164, 173, 166, 195, 220, 203, 243, 248, 382/254; 345/422, 423, 419, 545; 348/207.99, 348/208.1, E5.046; 375/240.08
See application file for complete search history.

(56) References Cited

U.S. PATENT DOCUMENTS

| | | | | |
|---|---|---|---|---|
| 5,915,046 | A | 6/1999 | Echigo et al. | 382/248 |
| 6,271,861 | B1 | 8/2001 | Sargent et al. | 345/432 |
| 6,313,840 | B1 | 11/2001 | Bilodeau et al. | 345/423 |
| 7,542,036 | B2 * | 6/2009 | Museth et al. | 345/420 |
| 8,131,098 | B2 * | 3/2012 | Watanabe et al. | 382/254 |
| 2008/0278479 | A1 | 11/2008 | Sun et al. | 345/419 |

FOREIGN PATENT DOCUMENTS

| | | |
|---|---|---|
| JP | 11-345347 | 12/1999 |
| JP | 3764765 | 4/2006 |
| JP | 4220010 | 2/2009 |

OTHER PUBLICATIONS

B. Price et al., "Object-based Vectorization for Interactive Image Editing", *The Visual Computer*, Springer Berlin / Heidelberg, vol. 22, Nos. 9-11, pp. 661-670 (Sep. 2006), ISSN: 0178-2789 (Print), 1432-2315 (Online); DOI 10.1007/s00371-006-0051-1; http://www.springerlink.com/content/068273724k7w27r7/.

A. Orzan et al., "Diffusion Curves: A Vector Representation for Smooth-Shaded Images" (date not known with certainty), http://artis.imag.fr/Publications/2008/OBWBTS08/diffusion_curves.pdf.

Y.-K. Lai et al., "Automatic and Topology-Preserving Gradient Mesh Generation for Image Vectorization", *ACM Transactions on Graphics (TOG)*, vol. 28, Issue 3 (Aug. 2009), *Proceedings of ACM SIGGRAPH 2009, Session: Vector Graphics and Point Distributions*, Article No. 85 (2009), ISSN: 0730-0301; http://doi.acm.org/10.1145/1531326.1531391.

* cited by examiner

*Primary Examiner* — Anh Hong Do
(74) *Attorney, Agent, or Firm* — Fitzpatrick, Cella, Harper & Scinto (57) ABSTRACT

A mesh generation unit divides an object area into respective meshes and obtains position information, gradient information, and color information of each vertex, which forms the meshes. An encoding unit obtains the color of each of the meshes using the color information and gradient information of each vertex. The encoding unit obtains the difference between each obtained color, and a color in a region in the object area that corresponds to each of the meshes. The encoding unit determines whether the sum of obtained differences is not smaller than a threshold. When the sum is smaller than the threshold, the encoding unit encodes the position information, gradient information, and color information of each vertex. When the sum is not smaller than the threshold, the encoding unit subdivides each mesh into submeshes, and encodes color information at a position in the object area that corresponds to each vertex of the submesh.

9 Claims, 5 Drawing Sheets

IMAGE PROCESSING APPARATUS AND IMAGE PROCESSING METHOD

BACKGROUND OF THE INVENTION

1. Field of the Invention

The present invention relates to a resolution-free representation technique.

2. Description of the Related Art

Resolution-free representations of illustrations and texts have conventionally adopted a method of approximating the contour of an object by a Bezier function, spline function, or the like. This method is fast and popular, but is not good at a complicated gradation representation.

In general, a gradient mesh tool available from Adobe Illustrator® is used to render a resolution-free representation of an object containing a complicated gradation. A gradient mesh can render a complicated object by giving a color and gradient to meshes to generate a cubic function (Japanese Patent Laid-Open No. 11-345347 and Japanese Patent No. 4220010).

For a resolution-free representation of an object in a raster image, several methods are proposed to approximate an image using meshes. An example is a method of approximating an image using triangular patches (Japanese Patent No. 3764765). However, this method suffers a problem in the representation of the object boundary. When the object boundary is a smooth curve, it is difficult to approximate the curve faithfully by linear meshes, and a faithful approximation requires many meshes. A high-order mesh is therefore necessary to approximate a complicated boundary using a smaller number of meshes.

As an example of the method using a high-order mesh, Bezier patches are subdivided to reduce an approximation error (Brian Price, William Barrett, "Object-Based Vectorization For Interactive Image Editing"). Another example is a method of approximating an image using a gradient mesh. As a method different from the approximation method using meshes, there is proposed a resolution-free representation method of approximating the feature line of an image by a Bezier curve, adding color information to the two sides of a curve, and solving a partial differential equation using the color of the curve, thereby rendering an image (Alexandrina Orzan, Adrien Bousseau, Holger Winnemoller, Pascal Barla, Joelle Thollot, David Salesin, "Diffusion Curves: A Vector Representation for Smooth-Shaded Images").

As a method of approximating an image using a gradient mesh, an optimization problem is solved to reduce the approximation error of the gradient mesh (U.S. 2008/0278479). Also, there is proposed a method of dividing an object into triangular meshes, and parameterizing them to generate a gradient mesh (Yu-Kun Lai, Shi-Min Hu, Ralph R. Martin, "Automatic and Topology-Preserving Gradient Mesh Generation for Image Vectorization").

The use of a high-order mesh allows approximating an object shape with a smaller number of meshes. However, several problems still remain unsolved when faithfully approximating an object color containing a high-frequency component, like a texture. These problems will be described below.

Since the foregoing method of subdividing Bezier patches to reduce an approximation error uses a high-order mesh, the object boundary can be approximated faithfully. However, subdividing meshes to reduce an approximation error increases the number of meshes in a region containing a high-frequency component, and increases the data amount.

The method of approximating the feature line of an image by a Bezier curve can represent the object shape with a small data amount. However, it is difficult to control the color between feature lines, and thus to faithfully represent an object color containing a high-frequency component.

The above-mentioned two methods of approximating an image using a gradient mesh can implement a resolution-free representation using a smaller number of meshes even for an object whose color change is complicated. However, it is hard even for these methods to represent a high-frequency component, like a texture, because the color is rendered by interpolation using a cubic mesh.

SUMMARY OF THE INVENTION

The present invention has been made to solve the above problems, and provides a technique for efficiently approximating a high-frequency component in an object area using a gradient mesh.

According to the first aspect of the present invention, an image processing apparatus comprising: a unit which extracts an area of an object as an object area from an image; a division unit which divides the object area into a plurality of meshes and obtains position information, gradient information, and color information of each vertex that forms each of the meshes; a calculation unit which calculates a color of each of the plurality of meshes using the color information and gradient information of each vertex that forms the mesh; a determination unit which obtains a difference between the color of each of the plurality of meshes that is calculated by the calculation unit, and a color in a region in the object area that corresponds to each of the plurality of meshes, and determines whether a sum of obtained differences is not smaller than a threshold; a first encoding unit which, when the sum is smaller than the threshold, encodes the position information, gradient information, and color information of each vertex that are obtained by the division unit; and a second encoding unit which, when the sum is not smaller than the threshold, subdivides each mesh divided by the division unit into submeshes, specifies color information at a position in the object area that corresponds to each vertex that forms each of the submeshes, and encodes the specified color information.

According to the second aspect of the present invention, an image processing apparatus comprising: a unit which extracts an area of an object as an object area from an image; a division unit which divides the object area into a plurality of meshes and obtains position information, gradient information, and color information of each vertex that forms each of the meshes; a calculation unit which calculates a color of each of the plurality of meshes using the color information and gradient information of each vertex that forms the mesh; a determination unit which obtains a difference between the color of each of the plurality of meshes that is calculated by the calculation unit, and a color in a region in the object area that corresponds to each of the plurality of meshes, and determines whether a sum of obtained differences is not smaller than a threshold; a first encoding unit which, when the sum is smaller than the threshold, encodes the position information, gradient information, and color information of each vertex that are obtained by the division unit; and a second encoding unit which, when the sum is not smaller than the threshold, subdivides each mesh divided by the division unit into submeshes, specifies color information at a position in the object area that corresponds to each vertex that forms each submesh, obtains color information at each vertex that forms each of the submeshes, and encodes a difference value between the obtained color information and the specified color information.

According to the third aspect of the present invention, an image processing method performed by an image processing apparatus, the method comprising: a step of extracting an area of an object as an object area from an image; a division step of dividing the object area into a plurality of meshes and obtaining position information, gradient information, and color information of each vertex that forms each of the meshes; a calculation step of calculating a color of each of the plurality of meshes using the color information and gradient information of each vertex that forms the mesh; a determination step of obtaining a difference between the color of each of the plurality of meshes that is calculated in the calculation step, and a color in a region in the object area that corresponds to each of the plurality of meshes, and determining whether a sum of obtained differences is not smaller than a threshold; a first encoding step of, when the sum is smaller than the threshold, encoding the position information, gradient information, and color information of each vertex that are obtained in the division step; and a second encoding step of, when the sum is not smaller than the threshold, subdividing, into submeshes, each mesh divided in the division step, specifying color information at a position in the object area that corresponds to each vertex that forms each of the submeshes, and encoding the specified color information.

According to the fourth aspect of the present invention, an image processing method performed by an image processing apparatus, the method comprising: a step of extracting an area of an object as an object area from an image; division step of dividing the object area into a plurality of meshes and obtaining position information, gradient information, and color information of each vertex that forms each of the meshes; calculation step of calculating a color of each of the plurality of meshes using the color information and gradient information of each vertex that forms the mesh; a determination step of obtaining a difference between the color of each of the plurality of meshes that is calculated in the calculating a color, and a color in a region in the object area that corresponds to each of the plurality of meshes, and determining whether a sum of obtained differences is not smaller than a threshold; a first encoding step of, when the sum is smaller than the threshold, encoding the position information, gradient information, and color information of each vertex that are obtained in the division step; and a second encoding step of, when the sum is not smaller than the threshold, subdividing, into submeshes, each mesh divided in the division step, specifying color information at a position in the object area that corresponds to each vertex that forms each submesh, obtaining color information at each vertex that forms each of the submeshes, and encoding a difference value between the obtained color information and the specified color information.

Further features of the present invention will become apparent from the following description of exemplary embodiments with reference to the attached drawings.

DESCRIPTION OF THE EMBODIMENTS

Embodiments of the present invention will now be described below with reference to the accompanying drawings. It should be noted that the following embodiments are merely examples of specifically practicing the present invention, and are concrete examples of the arrangement defined by the scope of the appended claims.

First Embodiment

Figure 1:
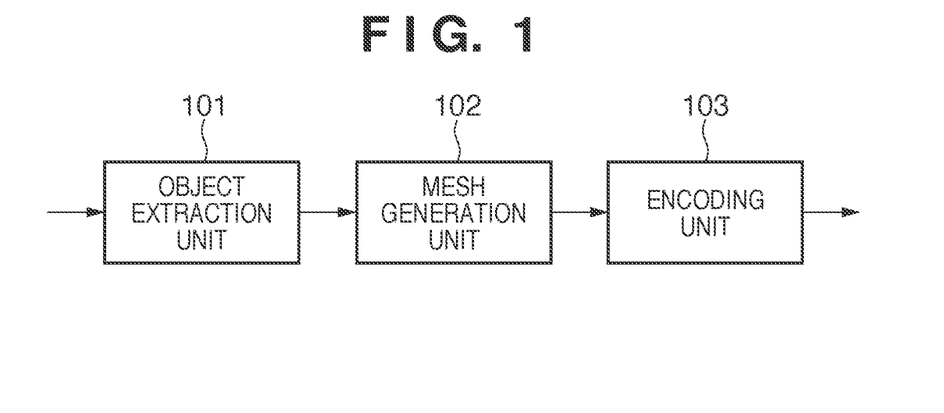
FIG. 1 is a block diagram exemplifying the functional arrangement of an image processing apparatus.
Figure 8:
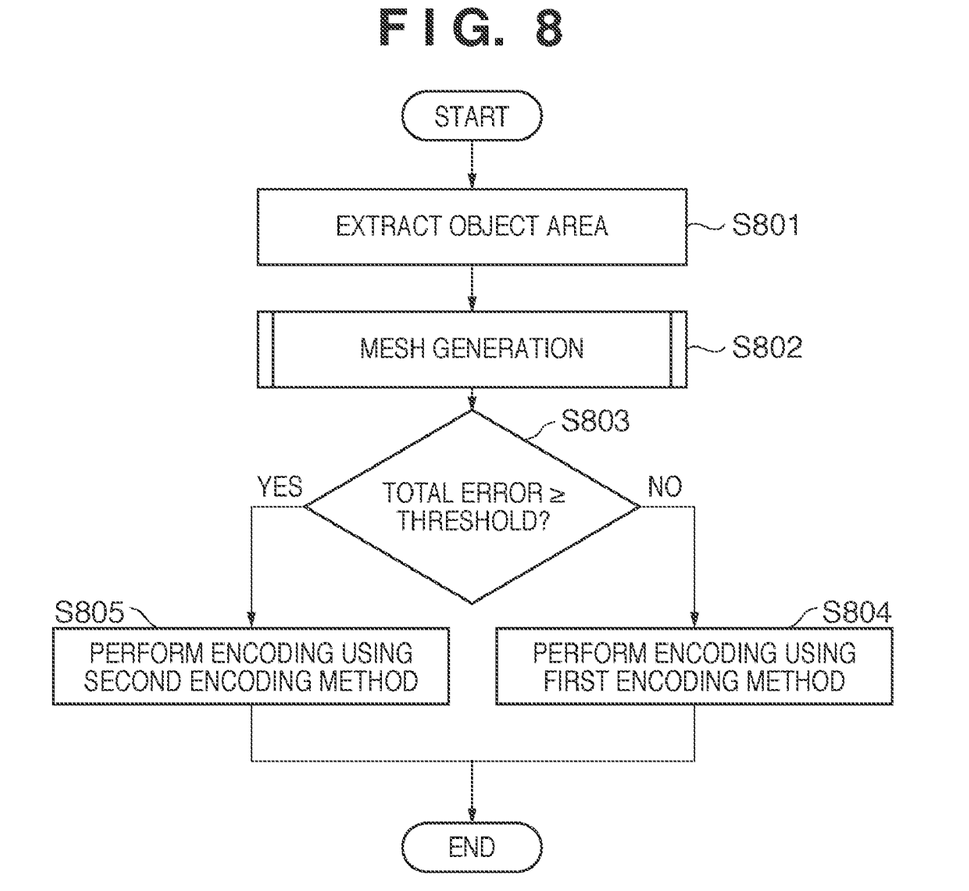
FIG. 8 is a flowchart of mesh encoding processing.

The functional arrangement of an image processing apparatus according to the first embodiment will be exemplified with reference to FIG. 1. In the following description, FIG. 8 showing the flowchart of mesh encoding processing by the image processing apparatus according to the first embodiment will be properly referred to.

An object extraction unit 101 receives an input image containing at least one object. The "object" means a text, object image, and the like. The embodiment assumes that the "object" has a color gradation. In the embodiment, mesh encoding is done for an object having a color gradation.

Figure 3A:
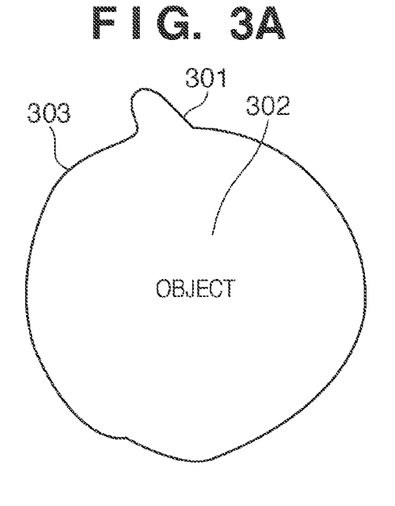
FIGS. 3A to 3D are views for explaining setting of representative points.

The object extraction unit 101 extracts the area of an object as an object area from the input image (step S801). Extraction of the object area adopts a known extraction method called a GrabCut method, but may use another extraction method. FIG. 3A exemplifies an extracted object area.

Data of the extracted object area contains the pixel positions (coordinate positions) of pixels which form a frame (boundary of an object area) 303 of an object area 301, and the pixel values of pixels which form an inside 302 of the object area 301. In the embodiment, the pixel value is given by 8 bits for each of R, G, and B color components. However, the types of color components such as grayscale or CMYK, and the number of bits which represent one color component are not limited to them. The data structure of the object area may be another one as long as the coordinate positions of pixels which form the frame 303 of the object area 301, and the pixel values of pixels which form the inside 302 of the object area 301 can be derived. The object extraction unit 101 sends data of the extracted object area to a subsequent mesh generation unit 102.

The mesh generation unit 102 generates meshes by dividing the object area into meshes using data of the object area (step S802). Details of processing by the mesh generation unit 102, i.e., processing in step S802 will be explained with reference to the flowchart of FIG. 2. In step S201, the mesh generation unit 102 obtains a reference position in the object area using the coordinate positions of pixels which form the frame of the object area. In the embodiment, the barycentric position (center position) of the object area is obtained as the reference position. As a matter of course, the reference position in the object area is not limited to the center position, and the processing to obtain the center position is not limited to this.

Figure 2:
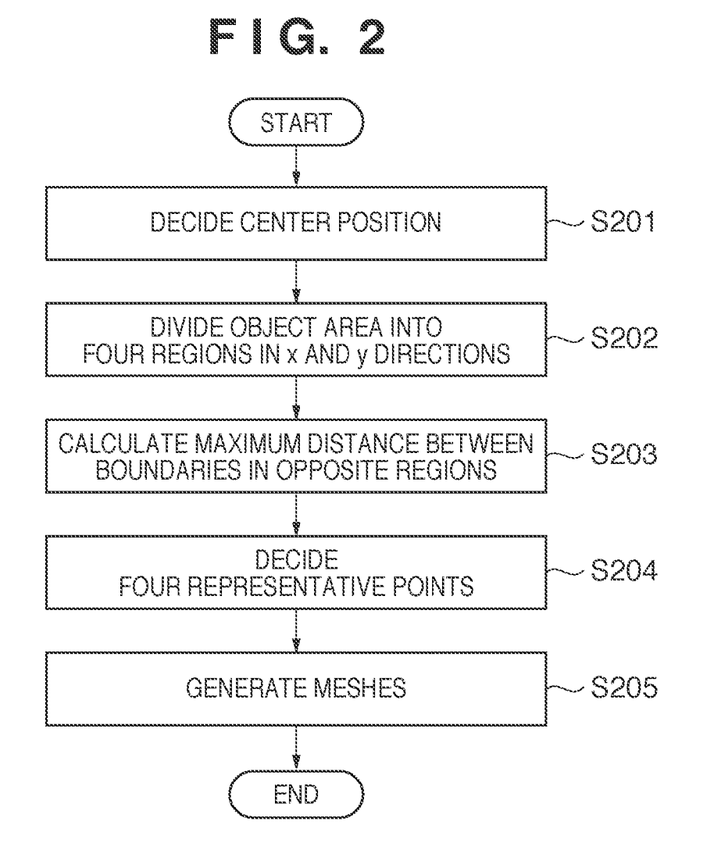
FIG. 2 is a flowchart of mesh generation processing.

In step S202, the mesh generation unit 102 sets, in the object area, two axes (x- and y-axes) which are perpendicular to each other at the center position obtained in step S201.

Then, the mesh generation unit 102 divides the object area into four along the two axes, i.e., sets four divided regions.

Figure 3B:
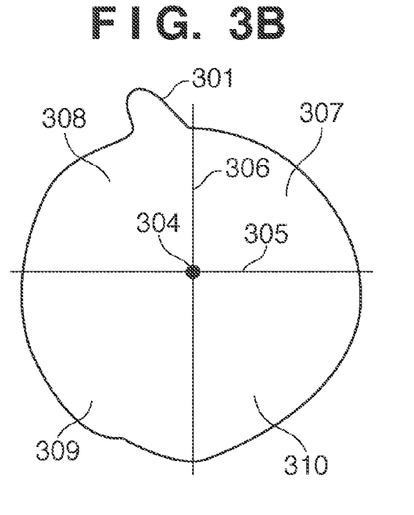

The processes in steps S201 and S202 will be explained with reference to FIG. 3B. In FIG. 3B, a center position 304 is one obtained in step S201. Two axes 305 and 306 are perpendicular to each other at the center position 304 and are along the x- and y-axes of an input image, respectively. By setting the two axes 305 and 306, the object area 301 is divided into divided regions 307, 308, 309, and 310.

Referring back to FIG. 2, in steps S203 and S204, the mesh generation unit 102 sets representative points on the frames of the respective divided regions so as to maximize the distances between the representative points in opposite divided regions.

Figure 3C:
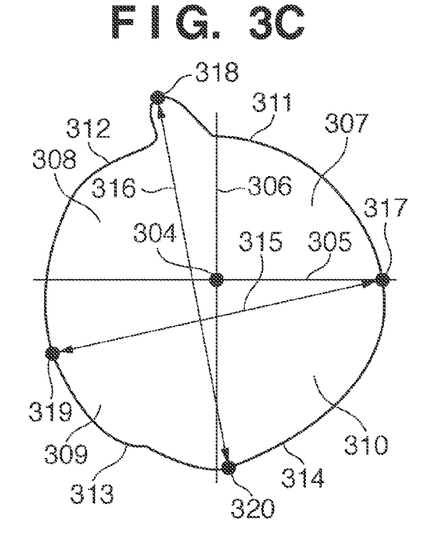

The processes in steps S203 and S204 will be explained with reference to FIGS. 3C and 3D. In FIG. 3C, reference numeral 311 denotes the frame of the divided region 307; 312, that of the divided region 308; 313, that of the divided region 309; and 314, that of the divided region 310.

The mesh generation unit 102 sets a representative point on the frame 311 of the divided region 307 and a representative point on the frame 313 of the divided region 309 opposite to the divided region 307. At this time, the mesh generation unit 102 decides the positions of the respective representative points to maximize the distance between the representative points. As a result, a representative point 317 is set as a representative point on the frame 311, and a representative point 319 is set as one on the frame 313, as shown in FIG. 3C.

Similarly, the mesh generation unit 102 sets a representative point on the frame 312 of the divided region 308 and a representative point on the frame 314 of the divided region 310 opposite to the divided region 308. At this time, the mesh generation unit 102 decides the positions of the respective representative points to maximize the distance between the representative points. Hence, a representative point 318 is set as a representative point on the frame 312, and a representative point 320 is set as one on the frame 314, as shown in FIG. 3C.

Figure 3D:
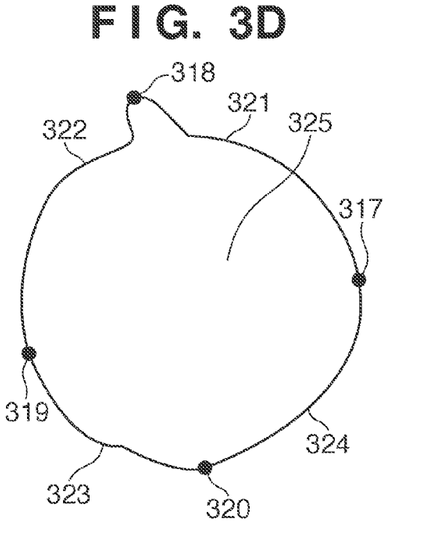

As a consequence, frames 321, 322, 323, and 324 are defined and set by the set representative points 317, 318, 319, and 320 serving as end points, as shown in FIG. 3D. By these processes, one representative point can be set on the frame of each divided region, and four representative points can be arranged uniformly. The method of determining the four representative points 317, 318, 319, and 320 is not limited to the above-described one. Another method as described in "Yu-Kun Lai, Shi-Min Hu, Ralph R. Martin, 'Automatic and Topology-Preserving Gradient Mesh Generation for Image Vectorization'" is also available.

Figure 4A:
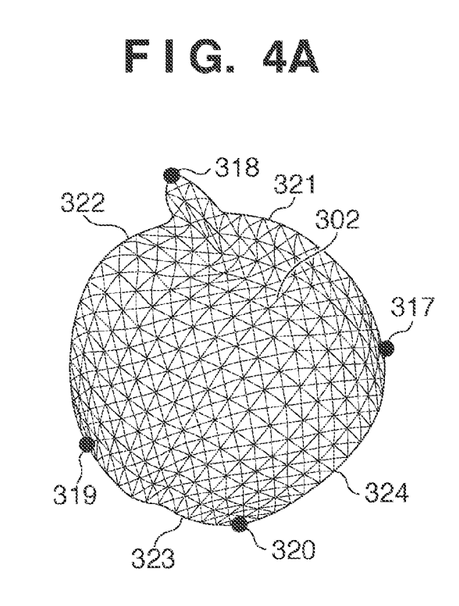
FIGS. 4A and 4B are views for explaining mesh generation processing.

Mesh generation processing (step S205) by the mesh generation unit 102 will be described with reference to FIGS. 4A and 4B. In general, when the boundary shape of the object area is relatively simple, it is desired to utilize a method of generating meshes using only the frames 321, 322, 323, and 324, which is a relatively high-speed mesh generation method (first mesh generation method). To the contrary, when the boundary shape of the object area is relatively complicated, it is desired to utilize a method of generating meshes using the frames 321, 322, 323, and 324 and the inside 302 of the object area (second mesh generation method). In the embodiment, the first or second mesh generation method can be arbitrarily employed.

The first and second mesh generation methods will be described briefly. In the first mesh generation method, meshes are generated using the coordinate positions of four representative points, and the "coordinate positions, in an input image, of pixels which form the frame (boundary of the object area) of the object area" that are contained in data of the object area.

In the second mesh generation method, meshes are generated using the coordinate positions of four representative points and data of the object area.

The first mesh generation method will be described. In the first mesh generation method, processing of obtaining a cubic Bezier spline curve (parametric curve) which connects adjacent representative points is executed first for respective frames between representative points, obtaining four cubic Bezier spline curves which approximate the frame shape of the object area. The frame shape of the object area can therefore be approximated using the four cubic Bezier spline curves. Then, Coons patches are generated from the four cubic Bezier spline curves, obtaining one parametric surface from the four cubic Bezier spline curves.

The first mesh generation method will be described with reference to FIG. 4B. In FIG. 4B, a cubic Bezier spline curve 921 connects the representative points 317 and 318. A cubic Bezier spline curve 922 connects the representative points 318 and 319. A cubic Bezier spline curve 923 connects the representative points 319 and 320. A cubic Bezier spline curve 924 connects the representative points 320 and 317.

Figure 4B:
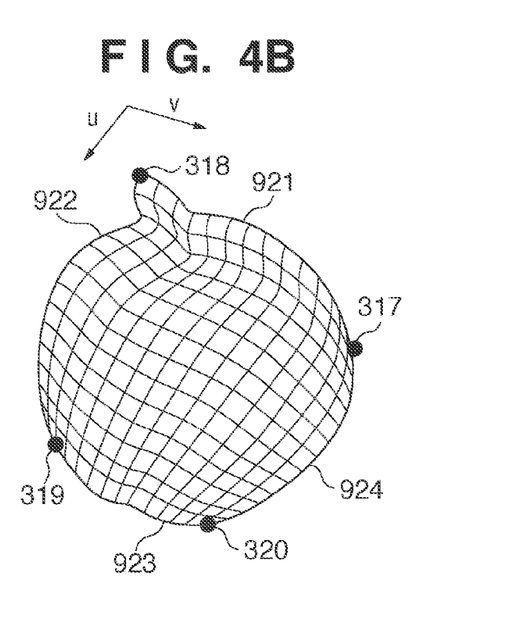

In FIG. 4B, the mesh generation unit 102 obtains the four cubic Bezier spline curves 921 to 924. The mesh generation unit 102 represents a region surrounded by the four cubic Bezier spline curves 921 to 924 as a parametric surface using Coons patches, thereby obtaining the parametric surface. This processing is a well-known technique, and a description thereof will be omitted.

After that, the mesh generation unit 102 divides the obtained parametric surface equally in the u and v directions defined on the parametric surface, generating meshes. In FIG. 4B, the cubic Bezier spline curves 922 and 924 run in the u direction (i.e., direction defined by the parametric surface), and the cubic Bezier spline curves 921 and 923 run in the v direction (i.e., direction defined by the parametric surface). In this case, points on the parametric surface are sampled two-dimensionally in the u and v directions. The parametric surface is divided into meshes each defined by four sampled points, generating meshes. That is, the parametric surface is equally divided into a plurality of meshes.

The parametric surface is expressed by a parameter which takes a value of 0 to 1 in each of the u and v directions. For example, when dividing the parametric surface into 10, "divide equally" means sampling points at respective positions set by changing the parameter in steps of 0.1. The division count may be set arbitrarily.

By sampling points on the parametric surface two-dimensionally in the u and v directions, the parametric surface (object area) is divided into meshes each defined by four sampled points. For each vertex which forms a mesh, position information indicating the position of the vertex, gradient information indicating a gradient at the position, and color information indicating a color at the position are attained upon the division processing.

Next, the second mesh generation method will be described. In the second mesh generation method, a plurality of feature points are set in the object area using the "pixel values of pixels in the object area" that are contained in data of the object area. Delaunay triangulation is done using the set feature points and the "coordinate positions of pixels which form the frame of the object area" that are contained in data of the object area. Resultantly, the object area is divided into triangular meshes, as shown in FIG. 4A. The object area is then converted into a quadrangular area so that the representative points 317 to 320 serve as the vertices of the quadrangular area (rectangular area), the frames 321 and 323 become opposite parallel sides of the quadrangular area, and the frames 322 and 324 become opposite parallel sides of the quadrangular area. This conversion is so performed as to minimize the shape distortion of the triangular meshes. This conversion may be done by another method so as to minimize the color distortion of the triangular meshes.

The obtained quadrangular area is divided equally in the u and v directions defined in the quadrangular area, generating quadrilateral meshes. The quadrangular area is expressed by a parameter which takes a value of 0 to 1 in each of the u and v directions. For example, when dividing the quadrangular area into 10 in each of the u and v directions, points at respective positions set by changing the parameter in steps of 0.1 are sampled. The division count and step may be set arbitrarily. By sampling points in the quadrangular area two-dimensionally in the u and v directions, the quadrangular area is divided into meshes each defined by four sampled points.

Position information of each vertex of the obtained mesh in the quadrangular area is converted into a coordinate position in the object area, obtaining (calculating) the coordinate positions of the four vertices of each divided mesh in the object area. Points at the obtained coordinate positions in the object area are sampled, dividing the object area into meshes each defined by four points. For each vertex which forms a mesh, position information indicating the position of the vertex, gradient information indicating a gradient at the position, and color information indicating a color at the position are attained upon the division processing. As described in "Yu-Kun Lai, Shi-Min Hu, Ralph R. Martin, 'Automatic and Topology-Preserving Gradient Mesh Generation for Image Vectorization'", the second mesh generation method is a known technique, and a further description thereof will be omitted.

An encoding unit 103 encodes and manages gradient mesh data generated by the mesh generation unit 102 using the first or second mesh generation method.

As the gradient mesh data encoding method, there are two methods: gradient mesh data is encoded (first encoding method), and detailed information of a gradient mesh is encoded (second encoding method). In the embodiment, the encoding unit 103 first obtains the color of each mesh in step S803. The mesh color is obtained using color information and gradient information of each vertex which forms a mesh. This color calculation is the same as processing performed when rendering a mesh. Hence, processing for obtaining a mesh color is popular one, and a detailed description thereof will be omitted.

In step S803, the encoding unit 103 obtains the difference (=error) between the color of a mesh and a color in a region in the object area that corresponds to the mesh. The absolute value (=error) of the color difference between regions is the sum of the absolute values of differences obtained for respective pixels after the absolute value of the color difference between corresponding pixels is obtained between regions.

In step S803, the encoding unit 103 further obtains the sum of obtained errors as a total error, and determines whether the total error is equal to or larger than a threshold. If the encoding unit 103 determines that the total error is smaller than the threshold, it encodes gradient mesh data (step S804). If the total error is equal to or larger than the threshold, the encoding unit 103 encodes detailed information of the gradient mesh (step S805). This is because it is difficult to approximate an object area containing a high-frequency component by a gradient mesh. Such data can be expressed more efficiently by holding the object area as detailed information without increasing the number of meshes, than by increasing the number of meshes to reduce the approximation error.

Note that the above-described processing of obtaining the total error is merely an example of processing of obtaining the "error between the object color and the gradient mesh color". Instead, an amount corresponding to the "error between the object color and the gradient mesh color" may be obtained by another processing. The gradient mesh encoding method may be switched using the number of meshes as a determination criterion, and the switching criterion is not limited to this.

The first encoding method of encoding only gradient mesh data will be explained. Gradient mesh data describes the contents of the following items as a text.

header including the number of vertices of meshes in the u direction, that of vertices of meshes in the v direction in the object area, and the number of regions the x- and y-coordinates of the vertices of meshes, the gradients of the meshes in the u and v directions, the scale values of the meshes in the u and v directions, the RGB values of the meshes, and the gradients of the color in the u and v directions In the embodiment, when the encoding unit 103 employs the first encoding method, it zips and manages text data describing the contents of these items. However, the encoding unit 103 may use another encoding method including lossy encoding. Another data description method is also available as long as position information, gradient information, and color information of a mesh can be derived.

Figure 5:
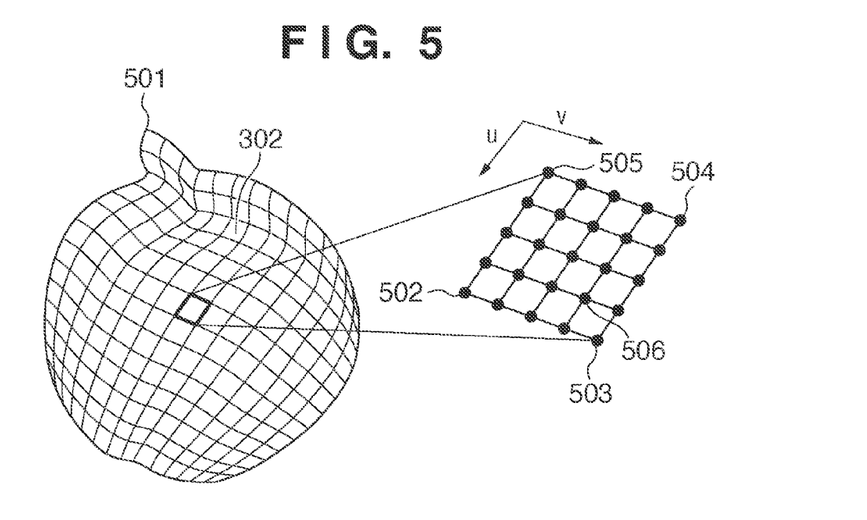
FIG. 5 is a view for explaining the second encoding method according to the first embodiment.

The second encoding method of encoding detailed information of a gradient mesh will be described with reference to FIG. 5. As shown in FIG. 5, the encoding unit 103 equally divides a gradient mesh 501 two-dimensionally in the u and v directions into meshes each defined by four points 502, 503, 504, and 505. The mesh defined by the four points 502, 503, 504, and 505 is expressed by a parameter which takes a value of 0 to 1 in each of the u and v directions. For example, when dividing the mesh defined by the four points 502, 503, 504, and 505 into 10, points at respective positions set by changing the parameter in steps of 0.1 are sampled. The division count may be set arbitrarily. After that, the encoding unit 103 creates detailed information containing the following pieces of information:

the x- and y-coordinates of each sampling point 506 the x- and y-coordinates of the four points 502, 503, 504, and 505 a pixel value (RGB value) at a position in the object area that corresponds to each sampling point 506 pixel values (RGB values) at positions in the object area that correspond to the four points 502, 503, 504, and 505

Note that these pieces of information at respective positions on a mesh are sorted in the raster scan order in the u and v directions, and the contents of the following items are described as a text:

header including the number of vertices of a mesh in the u direction, that of vertices of the mesh in the v direction, sampling counts in the u and v directions in the mesh, and the number of regions detailed information of the mesh That is, in the second encoding method, each divided mesh is subdivided into submeshes. Position information and color information of each vertex which forms the submesh are obtained. The obtained position information and color information of the submesh are encoded.

In the embodiment, when the encoding unit 103 employs the second encoding method, it zips and manages text data describing the contents of these items. However, the encoding unit 103 may use another encoding method including lossy encoding. Another data description method is also usable as long as similar information can be derived. In the embodiment, the mesh encoding method is switched for each object area, but may be switched for each mesh.

<Modification>

The respective units shown in FIG. 1 may be implemented by hardware or software (computer program). In the latter case, the software is installed in the memory of a general computer such as a PC (Personal Computer). By executing the installed software by the CPU of the computer, the computer implements the functions (functions of the respective units shown in FIG. 1) of the image processing apparatus. That is, the computer can be applied to the image processing apparatus (not shown). The hardware configuration of the computer applicable as the image processing apparatus according to the first embodiment will be exemplified with reference to FIG. 7.

Figure 7:
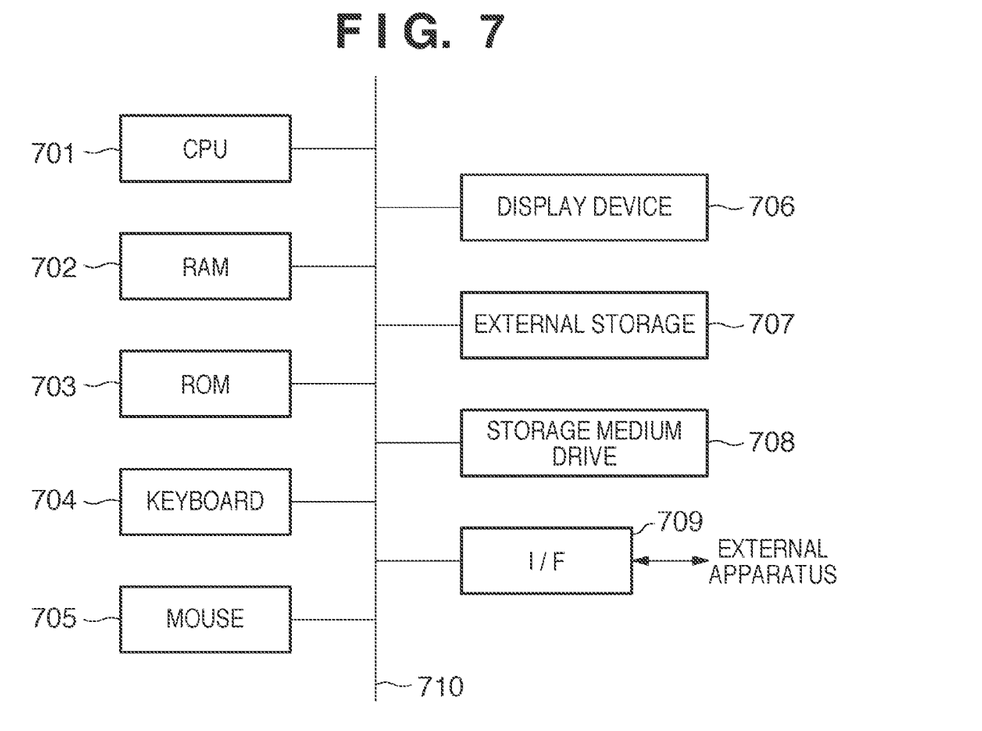
FIG. 7 is a block diagram exemplifying the hardware configuration of a computer.

A CPU 701 controls the overall computer using computer programs and data stored in a RAM 702 and ROM 703. In addition, the CPU 701 executes the processes described to be performed by the image processing apparatus. That is, the CPU 701 executes the processes described to be performed by the respective units shown in FIG. 1.

The RAM 702 is an example of a computer-readable storage medium. The RAM 702 has an area for temporarily storing computer programs and data loaded from an external storage 707 and storage medium drive 708, data received from an external apparatus via an I/F (interface) 709, and the like. Further, the RAM 702 has a work area used to execute various processes by the CPU 701. The RAM 702 can appropriately provide various kinds of areas.

The ROM 703 stores computer set data, boot programs, and the like. The user of the computer can manipulate a keyboard 704 and mouse 705 to input a variety of instructions to the CPU 701.

A display device 706 is formed from a CRT, liquid crystal display, or the like, and can display the result of processing by the CPU 701 as an image, text, or the like. For example, the display device 706 can display an input image as described above, explicitly display an extracted object area, and display a cubic Bezier spline curve, parametric surface, and the like which are obtained during mesh encoding. The display device 706 may display a GUI (Graphical User Interface) for selecting either the first or second mesh generation method. In this case, the user can select either the first or second mesh generation method by manipulating the GUI using the keyboard 704 and mouse 705.

The external storage 707 is an example of a computer-readable storage medium, and is a large-capacity information storage device typified by a hard disk drive. The external storage 707 saves an OS (Operating System), computer programs and data for causing the CPU 701 to implement the functions of the respective units shown in FIG. 1, input image data as described above, information described as known information, and the like. If necessary, the computer programs and data which are saved in the external storage 707 are loaded into the RAM 702 under the control of the CPU 701 and processed by the CPU 701.

The storage medium drive 708 reads out computer programs and data stored in a storage medium such as a CD-ROM or DVD-ROM, and outputs the readout computer programs and data to the external storage 707 or RAM 702. Part or all of information described to be saved in the external storage 707 may be stored in this storage medium and read by the storage medium drive 708.

The I/F 709 is used to connect an external apparatus to the computer. For example, an apparatus such as a digital camera for acquiring an input image as described above may be connected to the I/F 709. In this case, an input image is acquired from the apparatus via the I/F 709 to the RAM 702 or external storage 707. A bus 710 connects these units.

Note that an image processing application program executed by the CPU 701 basically includes functions corresponding to building components represented by the processing units in FIG. 1 and the steps in FIG. 2. The result of encoding by the encoding unit 103 is saved in the external storage 707.

Second Embodiment

Only a difference of the second embodiment from the first embodiment will be described. In other words, the remaining points are the same as those in the first embodiment. In the first embodiment, when the second encoding method is adopted, detailed information contains the x- and y-coordinates and RGB values of all sampling positions. However, no high compression ratio can be expected in this case. Thus, in the second embodiment, detailed information contains the x- and y-coordinates and RGB values for points at the four corners of a mesh, and contains only the RGB value for a sampling position. That is, the x- and y-coordinates of a sampling position are not described in detailed information, and if necessary, are obtained from the positions of the four corners of a mesh.

Figure 6:
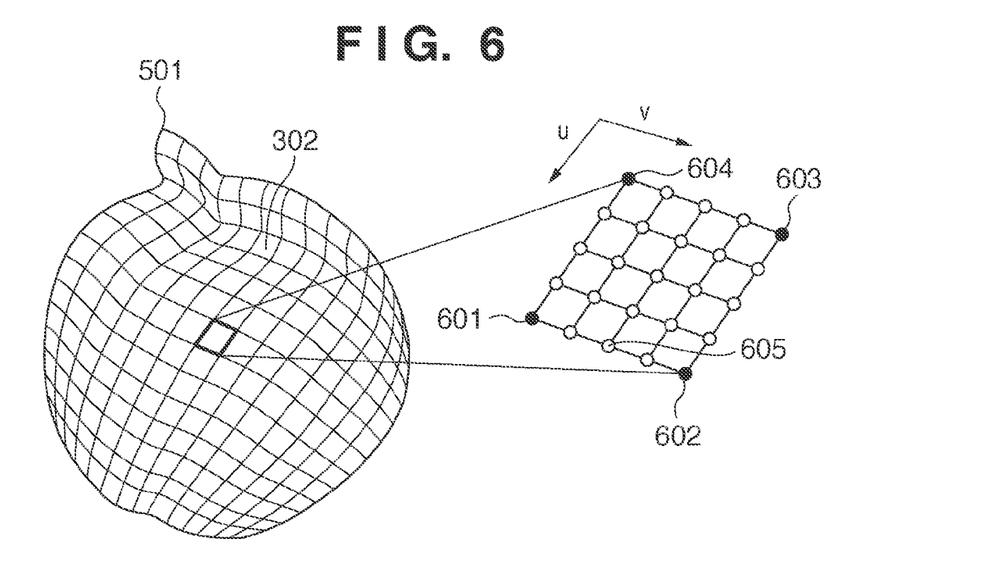
FIG. 6 is a view for explaining the second encoding method according to the second embodiment.

In the second embodiment, when encoding detailed information, a gradient mesh 501 is equally divided two-dimensionally in the u and v directions into meshes each defined by four points 601, 602, 603, and 604, as shown in FIG. 6. The method of subdividing the mesh into submeshes is the same as that in the first embodiment. An encoding unit 103 creates detailed information containing the following pieces of information:

the x- and y-coordinates of the four points 601, 602, 603, and 604 a pixel value (RGB value) at a position in the object area that corresponds to each sampling point 605 pixel values (RGB values) at positions in the object area that correspond to the four points 601, 602, 603, and 604

Note that these pieces of information at respective positions on a mesh are sorted in the raster scan order in the u and v directions, and the contents of the following items are described as a text:

header including the number of vertices of a mesh in the u direction, that of vertices of the mesh in the v direction, sampling counts in the u and v directions in the mesh, and the number of regions detailed information of the mesh Third Embodiment Only a difference of the third embodiment from the first embodiment will be described. That is, the remaining points are the same as those in the first embodiment. In the second embodiment, when the second encoding method is adopted, detailed information contains the RGB values of all sampling positions. In the third embodiment, detailed information contains difference values obtained as follows for all sampling positions, instead of the RGB values.

First, an encoding unit 103 performs interpolation using the RGB values of points at four corners which form a mesh, obtaining (specifying) RGB values at respective sampling positions (positions of the vertices of submeshes) in the mesh. Then, for each sampling position, the encoding unit 103 obtains the difference value between an RGB value at the sampling position and an RGB value at a position in the object area that corresponds to the sampling position. The encoding unit 103 describes the difference value obtained for each sampling position in detailed information.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-219767 filed Sep. 24, 2009, which is hereby incorporated by reference herein in its entirety.

What is claimed is:

1. An image processing apparatus comprising:
a unit which extracts an area of an object as an object area from an image;
a division unit which divides the object area into a plurality of meshes and obtains position information, gradient information, and color information of each vertex that forms each of the meshes;
a calculation unit which calculates a color of each of the plurality of meshes using the color information and gradient information of each vertex that forms the mesh;
a determination unit which obtains a difference between the color of each of the plurality of meshes that is calculated by the calculation unit, and a color in a region in the object area that corresponds to each of the plurality of meshes, and determines whether a sum of obtained differences is not smaller than a threshold;
a first encoding unit which, when the sum is smaller than the threshold, encodes the position information, gradient information, and color information of each vertex that are obtained by the division unit; and
a second encoding unit which, when the sum is not smaller than the threshold, subdivides each mesh divided by the division unit into submeshes, specifies color information at a position in the object area that corresponds to each vertex that forms each of the submeshes, and encodes the specified color information.

2. The apparatus according to claim 1, wherein, when the sum is not smaller than the threshold, the second encoding unit further obtains position information of each vertex that forms the submesh, and encodes the obtained position information.

3. The apparatus according to claim 1, wherein the division unit includes
a setting unit which sets four representative points on a frame of the object area by using pixel positions of pixels that form the frame,
a unit which obtains four curves by performing, for respective frames between adjacent representative points, processing of obtaining a curve that approximates a shape of the frame between adjacent representative points,
a unit which obtains a surface, using the four curves, for a region surrounded by the four curves,
a unit which samples points on the surface two-dimensionally, thereby dividing the object area into meshes each defined by four points, and
a unit which obtains position information, gradient information, and color information of each vertex that forms the mesh.

4. The apparatus according to claim 1, wherein the division unit includes
a setting unit which sets four representative points on a frame of the object area by using pixel positions of pixels that form the frame,
a unit which divides the object area into triangular meshes,
a unit which converts the object area into a quadrangular area having the four representative points as vertices so as to minimize a distortion of the triangular meshes,
a calculation unit which samples points two-dimensionally in the quadrangular area, and converts a coordinate position of each sampled point in the quadrangular area into a coordinate position in the object area, thereby obtaining the coordinate position of each sampled point in the object area,
a unit which samples points in the object area at coordinate positions obtained by the calculation unit, thereby dividing the object area into meshes each defined by four points, and
a unit which obtains position information, gradient information, and color information of each vertex that forms the mesh.

5. The apparatus according to claim 3, wherein the setting unit includes
a unit which obtains a reference position in the object area,
a unit which sets, in the object area, two axes that pass through the reference position and are perpendicular to each other, thereby dividing the object area into four divided regions by the two axes, and
a unit which sets representative points on frames of the respective divided regions so as to maximize distances between the representative points in the opposite divided regions.

6. A computer-readable storage medium storing a computer program for causing a computer to function as units of an image processing apparatus defined in claim 1.

7. An image processing apparatus comprising:
a unit which extracts an area of an object as an object area from an image;
a division unit which divides the object area into a plurality of meshes and obtains position information, gradient information, and color information of each vertex that forms each of the meshes;
a calculation unit which calculates a color of each of the plurality of meshes using the color information and gradient information of each vertex that forms the mesh;
a determination unit which obtains a difference between the color of each of the plurality of meshes that is calculated by the calculation unit, and a color in a region in the object area that corresponds to each of the plurality of meshes, and determines whether a sum of obtained differences is not smaller than a threshold;
a first encoding unit which, when the sum is smaller than the threshold, encodes the position information, gradient information, and color information of each vertex that are obtained by the division unit; and
a second encoding unit which, when the sum is not smaller than the threshold, subdivides each mesh divided by the division unit into submeshes, specifies color information at a position in the object area that corresponds to each vertex that forms each submesh, obtains color information at each vertex that forms each of the submeshes, and encodes a difference value between the obtained color information and the specified color information.

8. An image processing method performed by an image processing apparatus, the method comprising:
- a step of extracting an area of an object as an object area from an image;
- a division step of dividing the object area into a plurality of meshes and obtaining position information, gradient information, and color information of each vertex that forms each of the meshes;
- a calculation step of calculating a color of each of the plurality of meshes using the color information and gradient information of each vertex that forms the mesh;
- a determination step of obtaining a difference between the color of each of the plurality of meshes that is calculated in the calculation step, and a color in a region in the object area that corresponds to each of the plurality of meshes, and determining whether a sum of obtained differences is not smaller than a threshold;
- a first encoding step of, when the sum is smaller than the threshold, encoding the position information, gradient information, and color information of each vertex that are obtained in the division step; and
- a second encoding step of, when the sum is not smaller than the threshold, subdividing, into submeshes, each mesh divided in the division step, specifying color information at a position in the object area that corresponds to each vertex that forms each of the submeshes, and encoding the specified color information.

9. An image processing method performed by an image processing apparatus, the method comprising:
- a step of extracting an area of an object as an object area from an image;
- division step of dividing the object area into a plurality of meshes and obtaining position information, gradient information, and color information of each vertex that forms each of the meshes;
- calculation step of calculating a color of each of the plurality of meshes using the color information and gradient information of each vertex that forms the mesh;
- a determination step of obtaining a difference between the color of each of the plurality of meshes that is calculated in the calculating a color, and a color in a region in the object area that corresponds to each of the plurality of meshes, and determining whether a sum of obtained differences is not smaller than a threshold;
- a first encoding step of, when the sum is smaller than the threshold, encoding the position information, gradient information, and color information of each vertex that are obtained in the division step; and
- a second encoding step of, when the sum is not smaller than the threshold, subdividing, into submeshes, each mesh divided in the division step, specifying color information at a position in the object area that corresponds to each vertex that forms each submesh, obtaining color information at each vertex that forms each of the submeshes, and encoding a difference value between the obtained color information and the specified color information.

* * * * *